(12) United States Patent
Biziorek et al.

(10) Patent No.: US 10,588,267 B2
(45) Date of Patent: Mar. 17, 2020

(54) LARGE SQUARE BALER, COMBINATION OF AN AGRICULTURAL TOWING VEHICLE WITH SUCH, AND A METHOD FOR OPERATING SUCH

(71) Applicant: Deere & Company, Moline, IL (US)

(72) Inventors: Stephane Biziorek, Gray la Ville (FR); Heinrich Tepe, Gray (FR)

(73) Assignee: DEERE & COMPANY, Moline, IL (US)

( * ) Notice: Subject to any disclaimer, the term of this patent is extended or adjusted under 35 U.S.C. 154(b) by 198 days.

(21) Appl. No.: 15/808,239

(22) Filed: Nov. 9, 2017

(65) Prior Publication Data

US 2018/0125011 A1    May 10, 2018

(30) Foreign Application Priority Data

Nov. 10, 2016  (DE) ........................ 10 2016 222 118

(51) Int. Cl.
*A01F 15/08*    (2006.01)
*A01F 15/10*    (2006.01)
(Continued)

(52) U.S. Cl.
CPC ........ *A01F 15/0825* (2013.01); *A01D 89/001* (2013.01); *A01F 15/04* (2013.01);
(Continued)

(58) Field of Classification Search
CPC . A01D 89/001; A01F 15/0825; A01F 15/101; A01F 15/0875; A01F 15/10;
(Continued)

(56) References Cited

U.S. PATENT DOCUMENTS 7,021,207 B2 * 4/2006 Dubois ............... A01F 15/0825
100/4
7,047,719 B2 * 5/2006 Dubois ................. A01F 15/101
100/50
(Continued)

FOREIGN PATENT DOCUMENTS

DE    3809132 C1    5/1989
DE    10313492 A1    10/2004
(Continued)

OTHER PUBLICATIONS

European Search Report issued in counterpart application No. 17200321.2 dated Apr. 11, 2018. (7 pages).
(Continued)

*Primary Examiner* — Robert E Pezzuto

(57) ABSTRACT

A large square baler for performing a baling operation to form square bales includes a pickup unit for picking up crop lying on the ground, a cutter unit for cutting picked up crop into at least one predetermined cut length, a pre-compression chamber, a stuffer device, a bale chamber for forming a square bale from flakes of crop pre-compressed in the pre-compression chamber, and a tying system for binding the square bale. The stuffer device is configured to pre-compress the crop into the flakes in the pre-compression chamber and transport the flakes into the bale chamber. The cutter unit is controlled in dependence on a tying operation conducted by the tying system and on at least one parameter representing the square bale size.

7 Claims, 4 Drawing Sheets

(51) Int. Cl.
*A01F 15/04* (2006.01)
*A01D 89/00* (2006.01)
*A01F 15/14* (2006.01)
*A01F 29/06* (2006.01)
*A01F 29/09* (2010.01)

(52) U.S. Cl.
CPC ............ *A01F 15/046* (2013.01); *A01F 15/10* (2013.01); *A01F 15/14* (2013.01); *A01F 29/06* (2013.01); *A01F 29/09* (2013.01); *A01F 15/042* (2013.01); *A01F 2015/102* (2013.01); *A01F 2015/107* (2013.01)

(58) Field of Classification Search
CPC ........ A01F 15/04; A01F 15/046; A01F 15/14; A01F 29/06; A01F 29/09
USPC .............. 56/10.2 R, 341; 100/4, 6, 8, 50, 88
See application file for complete search history.

(56) References Cited

U.S. PATENT DOCUMENTS 7,093,537 B2 * 8/2006 Dubois ............... A01F 15/0875 100/188 R
7,287,365 B2 * 10/2007 Dubois ............... A01F 15/0825 100/88

FOREIGN PATENT DOCUMENTS

DE 10319985 A1 12/2004
WO 2014125029 A1 8/2014

OTHER PUBLICATIONS

German Search Report issued in counterpart application No. 102016222118.3 dated Jul. 25, 2017. (10 pages).

* cited by examiner

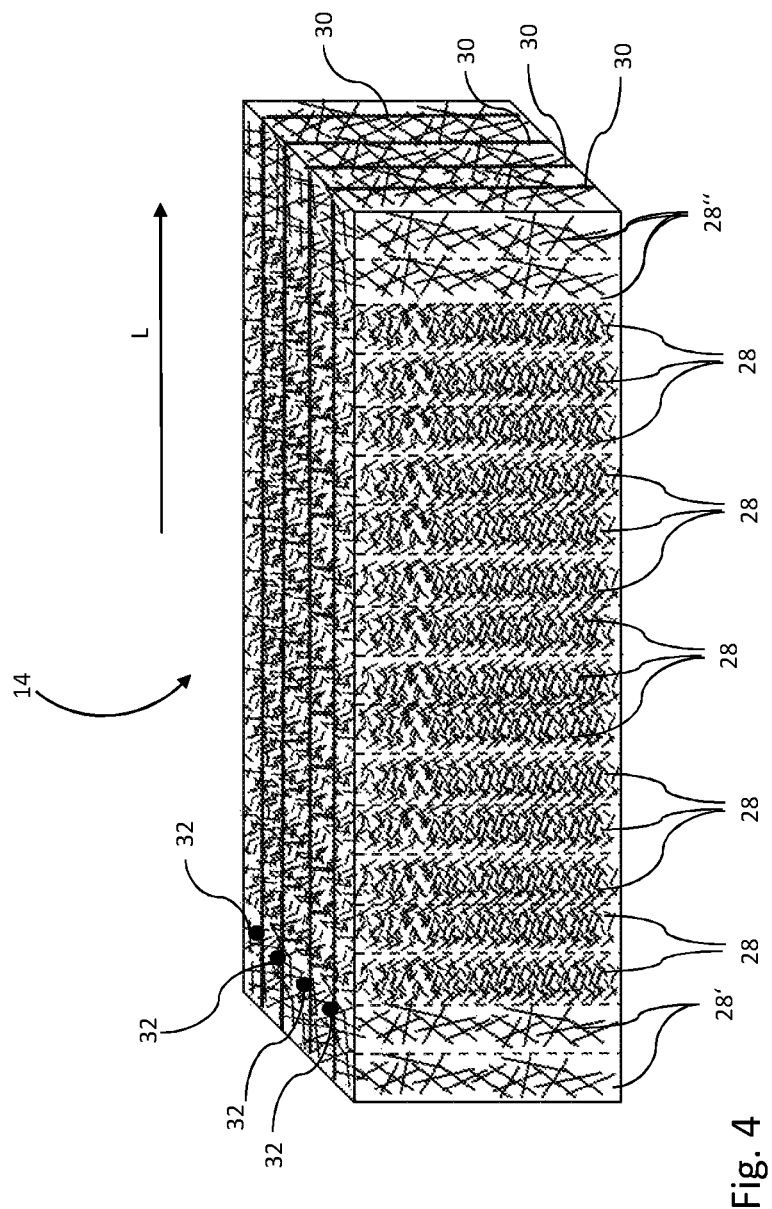

LARGE SQUARE BALER, COMBINATION OF AN AGRICULTURAL TOWING VEHICLE WITH SUCH, AND A METHOD FOR OPERATING SUCH

RELATED APPLICATIONS

This application claims priority to German Application Ser. No. 102016222118.3, filed Nov. 10, 2016, the disclosure of which is hereby expressly incorporated by reference in its entirety.

FIELD OF THE DISCLOSURE

The present disclosure relates to a large square baler for forming square bales, and in particular, a large square baler in combination with an agricultural towing vehicle and method for operating the same.

BACKGROUND

Large square balers are known in the prior art. Such balers have a pickup or pickup unit for crop lying on the ground. The crop is picked up and delivered to a cutter unit, where it is reduced in size. The cutter unit enables a predetermined cut length. For this, the cutter unit has a rotor with teeth that rotates against knife edges. The knife edges can be variably set in position so as to enable no cutting or different cut lengths. The optionally cut crop is sent to a pre-compression chamber and pre-compressed into flakes. For this, the crop is caught by a stuffer and transported or lifted into a long channel that forms the pre-compression chamber. As a rule, one or two short lifts of crop made by the stuffer are pre-compressed and lifted as a flake into a rectangular bale chamber by a longer stroke. The flake is immediately captured by an oscillating rectangular plunger and pressed against a previously pre-compressed flake. In the end, a square bale forms through the successive pre-compression of several flakes.

A tying system serves to bind the individual flakes into a square bale, so that the bale density achieved as it is formed is retained and the compressed rectangular solid bale can be further processed or transported or loaded as a bale. It is disadvantageous that often, if the cut lengths are relatively short, deep cuts or pinches of the binder twine on the end faces of the square bale can be seen due to which the bale becomes misshapen and frays. This occurs when portions of the cut-short crop are not held in place, in particular between the binding twines of the square bale, and could come loose.

SUMMARY

The present disclosure relates to a large square baler for forming square bales with a pickup unit for the harvested material lying on the ground, a cutter unit for cutting the picked-up material into at least one predetermined cut length, a pre-compression chamber, a stuffer device, and a bale chamber for formation of the square bale from the flakes of crop that are pre-compressed in the pre-compression chamber, where the stuffer device pre-compresses the crop in the pre-compression chamber into flakes and transports the flakes into the bale chamber. The large square baler includes a tying system for binding the square bale. Moreover, a combination of an agricultural towing vehicle with a large square baler and a method for operating a large square baler are disclosed.

In one embodiment of the present disclosure, a large square baler is designed so that the cutter unit can be controlled in dependence on a tying operation carried out by the tying system and on at least one parameter representing the square bale size, so that in each case in the pickup of crop, for at least one of the first and for at least one of the last flakes of a square bale forming operation, the cutter device can be deactivated or can be operated with a longer cut length than for the other flakes. This means that, in each case, a longer cut length can be chosen for the first flake or for a plurality of the first flakes of a square bale and for the last flake or for a plurality of the last flakes of the square bale. As such, the edge regions on the end faces of each square bale are less penetrable for the loops or the twine, and deep cuts or deep pinches of the twine on the end faces of the square bale do not arise.

The at least one parameter representing the square bale size can be the square bale length or the sum of the pre-compressed flakes, where a length measuring device for the formed square bales or a counting device for the pre-compressed flakes is provided. Thus, a star wheel can be used as length measuring device, as is used on some large square balers, where the rotations of the star wheel are proportional to the length of the square bale. Further, the strokes of the packer unit can be counted by a traditional counting mechanism such as, for example, a counter wheel. Here the strokes of the packer unit are proportional to the number of flakes, and the length of the square bale can be determined from the number of flakes. It is conceivable that both the length or the number of flakes of the square bale being formed can be selected by an operator of the large square baler.

The large square baler further includes a tying system to tie or bind the square bale, where the at least one parameter representing the square bale size is the beginning or the end of a tying operation. In this case, the parameter is defined for a square bale by the beginning and the end of the binding operation, and it is also conceivable here that an operator of the large square baler starts the binding operation by command, for example, by pushing a button. After initiating the command, the cutter unit is operated so that only after the first flake, or only after a plurality of first flakes, a smaller cut length selected. After initiating the tying operation, the length of the square bale can be determined by a preselected number of flakes, or by a preselected length, whereupon the cutter unit is operated so that for the last flake, or for a plurality of last flakes, a longer cut length is selected in a timely manner before completing the tying operation or the final tying off.

The start of the binding operation begins in the known manner and before the transport of the first flake from the pre-compression chamber into the bale chamber by placing the twine or a knot, where the end or tying off of the square bale takes place at the end of a bale forming cycle after the transport of the last flake from the pre-compression chamber into the bale chamber. The pre-compressed crop can be transported through the pre-compression chamber with just one stroke of the packer unit, or with a plurality of strokes. This adjustment falls to the operator, who chooses the desired variation in each case according to crop or harvesting conditions.

An electronic control unit is provided, and the cutter unit comprises an electronically controllable actuator. A control signal or sensor signal, which can be generated in dependence on the at least one parameter representing the square bale size, can be sent to the control unit. The electronic control unit controls the cutter unit in dependence on the control signal. The actuator, which is electronically controllable by the control unit, adjusts the cutting tools provided in the cutter unit, which are designed, for example, as knives that pivot in and out. The pivoting of the knives in and out can take place via hydraulic or electronic actuators. The knives can be disposed in one or more groups, so that, for example, every knife or every second or third knife of the knives disposed in a row are coupled to each other in a pivot device. In this way, the knives in one group or in two or more groups can be pivoted in and out independently of one another. In the case of the knives being disposed in just one group, one can only choose between a cut length that the pickup unit provides (thus a cut length of the crop as it is picked up from the ground) and a cut length reduced by the cutter unit. If the knives are disposed in a plurality of groups, on the other hand, additional cut lengths can be set.

A combination of an agricultural towing vehicle and a large square baler calls for an input device disposed to be provided on an agricultural vehicle. A value that can be adjusted for the at least one parameter affecting the square bale size can be input there by an operator. The cutter unit is controlled in dependence on said value, and the number of flakes that are pre-compressed with longer cut length is specified so that, for example, the last three and the first three flakes are always pre-compressed with longer cut lengths. It can be provided that the value for the number of the first and the last flakes of a square bale forming operation, in dependence on which the cutter unit is controlled, can be variably set. Thus, an operator can determine how many flakes with a longer cut length should be processed.

In one example, a length "X" for the length of a completely formed and tied square bale is sent to the control unit. The electronic control unit correspondingly registers, for example, a sensor signal for the strokes completed by the packer unit or a plunger, the number of the first flakes with longer cut length at the beginning of the bale forming operation, and compares this to the preset number of flakes with longer cut length. If the value has been reached, the cutter unit is controlled and the cut length reduced to a normal bale forming size. In addition, the current length of the square bale is determined via an additional sensor and registered, where, for example, the length reaches the value "Y" when the desired preset number of the first flakes with longer cut length have been pre-compressed. The control unit controls this quantity for the determination of the new control of the cutter unit for the last flakes, where upon reaching a length of (X−Y), the cutter unit is controlled so that, in all, the value X for the length of the square bale results when the forming operation is complete.

The method for operation of a large square baler with the above described combination includes a tying operation for a square bale that is to be formed, a square bale forming operation, the control of the cutter unit in dependence on the tying operation and a quantity that affects the square bale size during the square bale forming operation, where the control of the cutter unit takes place during the beginning and the end of the square bale forming operation, where the cutter unit is controlled so that, in each case, during the pickup of crop, the cutter unit is deactivated for at least one of the first and for at least one of the last flakes of a square bale forming operation or is operated with a cut length that is longer than in the case of the other flakes. The "beginning" and "end" of the square bale forming operation define a period of time that is defined by the number of flakes with longer cut length that are to be pre-compressed. "At least one of the first flakes" and "at least one of the last flakes" may refer to only one flake, a plurality of first flakes, or a plurality of last flakes that can be pre-compressed with longer cut length.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 shows a schematic representation of a formed square bale.

DETAILED DESCRIPTION

Figure 1:
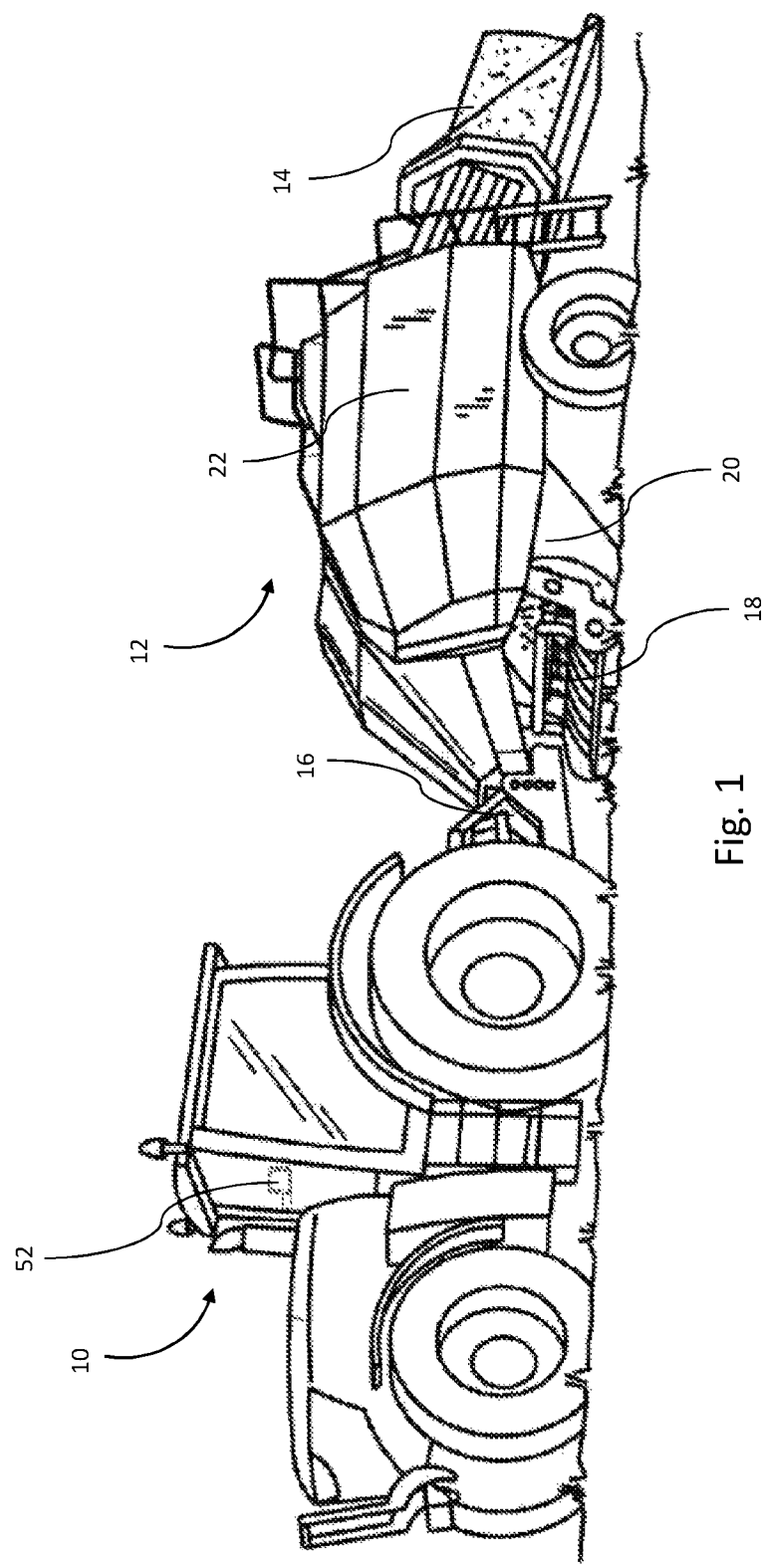
FIG. 1 shows a schematic perspective side view of a combination of an agricultural machine with a large square baler.

FIG. 1 shows a combination of an agricultural vehicle 10, for example, a tractor, and a large square baler 12 for forming square bales 14.

The large square baler 12 includes a hitch 16, which connects the large square baler 12 to the vehicle 10 and by means of which the large square baler 12 is moved over a field for pickup of crop. Mown crop is picked up via a pickup unit 18 mounted at the front side and transported to a pre-compression chamber 20, from which the pre-compressed crop goes to a rectangular bale chamber 22 of the large square baler 12.

Figure 2:
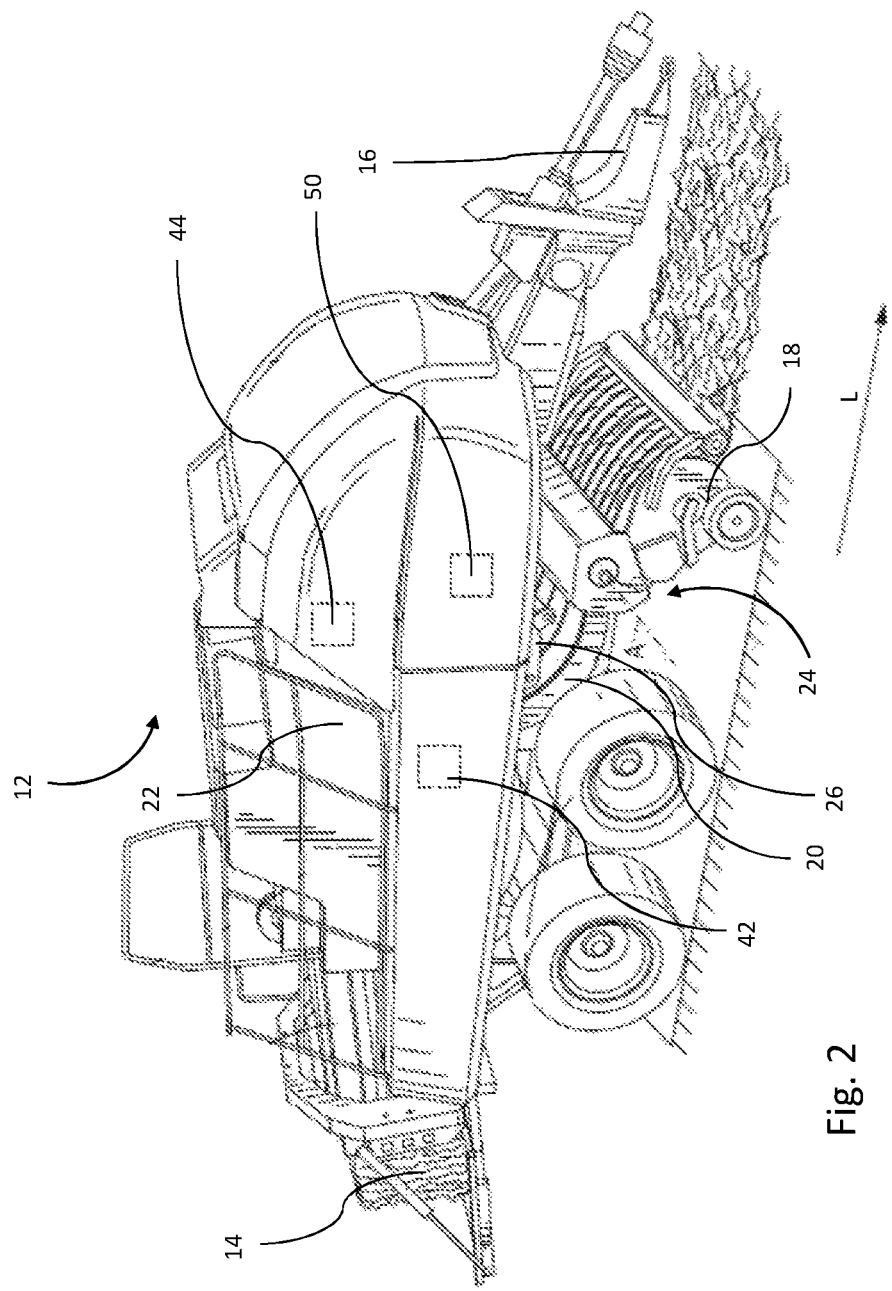
FIG. 2 shows a schematic perspective side view of a large square baler as in FIG. 1.

A large square baler 12 is shown in further detail in FIG. 2. A cutter unit 24, by means of which the picked up crop is cut and transported to the pre-compression chamber 20, is shown between the pickup unit 18 and the pre-compression chamber 20. Via a stuffer device 26, the sliced crop is transported or lifted in individual pre-compressed flakes 28, 28', 28" into the bale chamber 22, in which a plunger (not shown) compresses the individual flakes 28, 28', 28" lifted into the bale chamber 22 into a square bale 14. The square bale 14 is bound in a known way via a tying unit (not shown) disposed at the bale chamber. Here, at the beginning of a forming operation, twine 30 is laid in the bale chamber 22 via a knotter unit (not shown) lying in the lengthwise direction L around the growing square bale 14 in the further course of the forming operation and being tied off with a knot 32 by the knotter unit at the end of the forming operation, where a plurality of twines 30 are simultaneously arranged offset from each other across the lengthwise direction L of the square bale, as is shown in FIG. 4.

Figure 3:
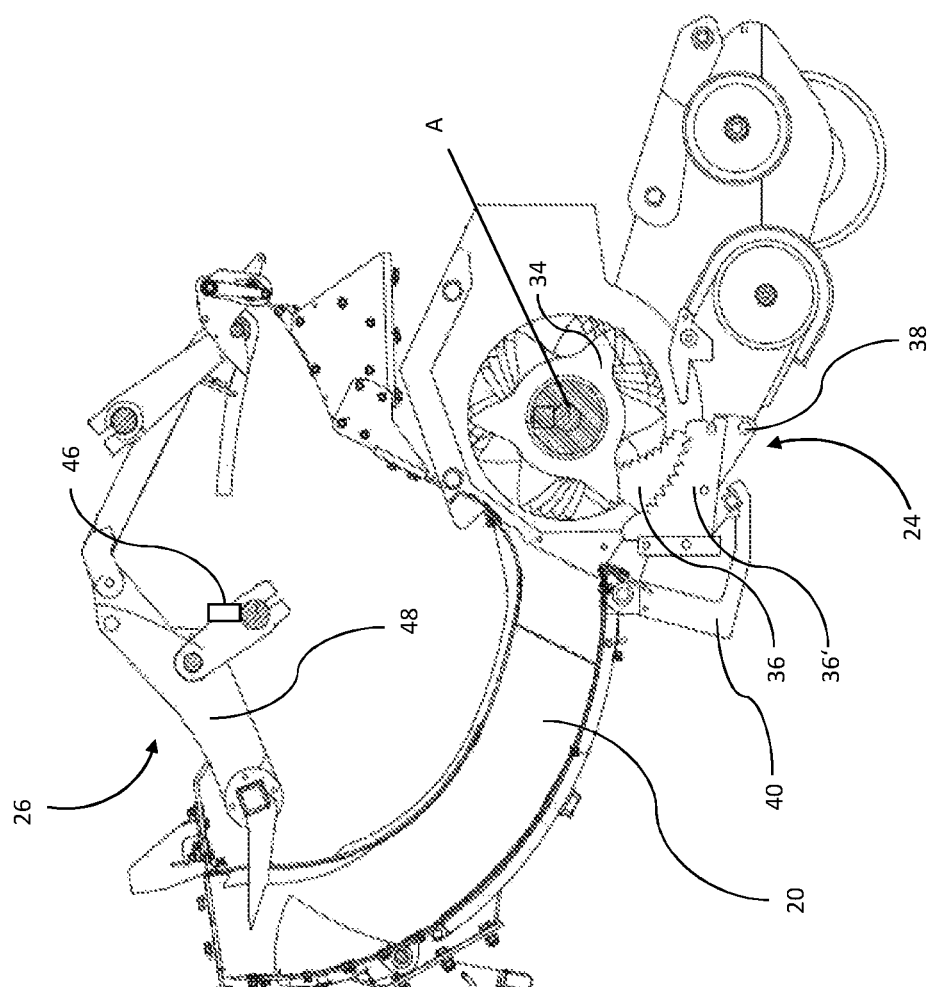
FIG. 3 shows a schematic cross-sectional view of a pickup unit and pre-compression chamber of the large square baler from FIG. 2.

As is shown in FIG. 3, the cutter unit 24 defines an axis of rotation A, on which is disposed a plurality of transport rotors 34 which can be brought into engagement with knives 36, 36'. The knives 36, 36' are disposed under the axis of rotation A, or which are engaged with it. The cutters 36, 36' are pivoted on a pivot axis 38 at predetermined intervals along the axis of rotation A and can be pivoted in and out via a pivot unit 40, and through this can be brought into engagement or pivoted out from engagement with the transport rotors 34. The pivoting of the knives in and out takes place via actuators, which are not shown and which are connected to the pivot unit 40, where more than one set of knives 36, 36' can be pivoted in and out separately from each other. FIG. 3 shows a first set of knives 36, which are engaged with the transport rotors 34, and another set of knives 36', which are not engaged with the transport rotors 34. Here, it is possible to bring both the one set of knives 36 as well as the other set of knives 36' into engagement together or also pivot them together out from engagement. It is also conceivable to provide only one or more additional sets of knives.

A length measurement is undertaken on the square bale 14 via a length sensor 42 disposed at the bale chamber 22, where the square bale 14 increases in length with each supplied flake 28, 28', 28" during the forming operation. The length sensor 42 can, for example, be designed as a sensor wheel that is engaged with a surface of the square bale, where conclusions can be drawn with regard to the (growing) length of the bale 14 in situ by means of the rotations of the sensor wheel during the forming operation. Another sensor 44, for example, in the form of a switch is provided in the region of the knotter unit and signals the beginning or the end of a forming operation, namely when the twine 30 is laid or the knots are made. Another sensor 46 is disposed on the plunger or, as shown in FIG. 3, on the stuffer device, and signals the number of strokes of the plunger or of a stuffer 48 in the stuffer device. Such a sensor can, for example, be designed as a magnetic sensor or a rotation sensor, which is disposed on a shaft and has a rotary speed proportional to the strokes of the plunger or the stuffer 48. From the number of strokes of the plunger or the stuffer 48, a determination can be made regarding the number of individual pre-compressed flakes 28, 28', 28" that are transported through the pre-compression chamber 20 into the bale chamber 22. The appropriate choice and arrangement of said sensors 42, 44, 46 lies within the general knowledge of one skilled in the art.

An electronic control unit 50 provided on the large square baler 12 serves to receive sensor signals of said sensors 42, 44, 46 and controls the cutter unit 24 in dependence on the signals provided by the sensors 42, 44, 46 and in dependence on parameters that are preset and stored in the electronic control unit or that can be entered as needed by an operator via a data entry unit 52 disposed on the vehicle 10. Among others, a desired length of the completely formed bale 14 and a number of the first and the last flakes 28', 28" that should be pre-compressed with longer cut length are provided as parameters. In addition, a cut length is pre-established or preset for the cutter unit 24 and can also be preset as required by the operator via the data entry unit 52, making possible an appropriate choice of the sets of knives 36, 36' that are engaged with the transport rotors 34. The forming operation is monitored through control algorithms stored in the electronic control unit and the cutter unit 24 is controlled according to the settings, thus according to the desired cut length variation for the first and last flakes 28', 28" that are to be pre-compressed, in combination with the preset parameters for the bale length and the number of the first and last flakes 28', 28".

In detail, the method for forming square bales may be executed by means of the aforementioned large square baler 12, where the crop is picked up by the pickup unit 18 and fed in the usual way to an adjustable cutter unit 24. From there, the crop goes to the pre-compression chamber 20 and is pre-compressed there into individual flakes 28, 28', and transported to the bale chamber 22 by means of the stuffer device 26. In the bale chamber 22, the individual flakes 28, 28', 28" are pressed by the plunger into a square bale. The tying operation is started at the beginning of a forming operation for a new bale by twine being laid in bale chamber 22 by the knotter unit, the twine thus extending along a face side of the bale 14 that is at the rear in the direction of travel and in the further course of the forming operation extending along the upper and lower long sides of the bale 14 in the lengthwise direction L (see FIG. 4).

With the beginning of the forming operation, the length sensor 42 provides a signal proportional to the growing length of the bale. Furthermore, at the beginning of the forming operation, a cut length that is longer than in the further course of the forming operation is selected so that crop that is cut longer is pre-compressed for the first flake or flakes 28' of the bale 14. In addition, the values for the desired bale length (X) and for the number of first and last flakes 28' (1 or more, where an example with a number of 2 is selected in FIG. 4) were stored or preset in the control unit 50. After reaching the desired number of first flakes 28', thus after 2 pre-compressed flakes 28' according to the example shown in FIG. 4, the control unit 50 registers the current length (Y) of the bale 14 that has been formed up to that point and in this way determines the length of the 2 first pre-compressed flakes 28'.

At the same time, the control unit 50 controls the cutter unit 24 and causes the adjustment of the knives 36, 36' (knives 36, 36' are pivoted into engagement with the transport rotors 34), so that the crop cut length provided for the following forming operation is set, and through this, a shorter cut length results than at the beginning of the forming operation. The forming operation is now continued with shorter cut lengths, and the length of the growing bale 14 is regularly determined or provided by the length sensor. Upon reaching a current length for the bale that corresponds to the desired bale length (X) minus the length of the 2 first pre-compressed flakes 28' (Y), thus at a length of X−Y, the control unit 50 controls the cutter unit 24 and adjusts the knives 36, 36' (knives 36, 36' are pivoted out of engagement with the transport rotors 34) so that the crop cut length provided for the end of the forming operation is set. Again, the longer cut length, as at the beginning of the forming operation, results and longer cut crop is pre-compressed for the last flake or flakes 28" of the bale 14 (in the example shown in FIG. 4, the last two pre-compressed flakes 28").

After pre-compressing the last flake or flakes 28", the length sensor 42 provides a bale length that corresponds to the desired length X. After pre-compression of the last flake or flakes 28", the knotter unit takes action by guiding the twine over the face of the bale 14 that is in front in the direction of travel and ties the ends of the twine together in a knot 32. Here, the individual pre-compressed flakes 28, 28', 28" can be bound into a formed bale 14. The result is a square bale 14, as shown in FIG. 4, with a plurality of flakes 28 in the middle region of the bale 14 that have a short cut length and end face flakes 28', 28" that have a longer cut length. The result is a more uniform bale shape and lower loss due to crop falling out of the bale 14, since the twine cannot be tied as deeply as usual into the surface of the bale 14, in particular because of the longer cut crop. In addition, the compression of crop in bale 14 is increased overall through this.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A large square baler for performing a baling operation to form square bales, comprises:
   a pickup unit for picking up crop lying on the ground,
   a cutter unit for cutting picked up crop into at least one predetermined cut length,
   a pre-compression chamber,
   a stuffer device,
   a bale chamber for forming a square bale from flakes of crop pre-compressed in the pre-compression chamber, and
   a tying system for binding the square bale,
   wherein, the stuffer device is configured to pre-compress the crop into the flakes in the pre-compression chamber and transport the flakes into the bale chamber,
   wherein, the cutter unit is controlled in dependence on a tying operation conducted by the tying system and on at least one parameter representing a square bale size,
   further wherein, during the picking up of the crop, the cutter unit is operably controlled to be deactivated or operated with the at least one predetermined cut length being longer than at least one of a first and at least one of a last of the flakes during the baling operation.

2. The large square baler of claim 1, further comprising a length measuring device for the formed square bale or a counting device for the pre-compressed flakes;
   wherein at least one parameter representing the square bale size comprises the square bale length or a sum of the pre-compressed flakes.

3. The large square baler of claim 1, further comprising:
   an electronic control unit; and
   the cutter unit comprises an electronically controllable actuator, where a sensor signal is generated in dependence on the at least one parameter representing the square bale size and is sent to the electronic control unit,
   wherein, the electronic control unit controls the cutter unit in dependence on the control signal.

4. A combination of an agricultural towing vehicle and a large square baler, comprising:
   a pickup unit for picking up crop lying on the ground,
   a cutter unit for cutting picked up crop into at least one predetermined cut length,
   a pre-compression chamber,
   a stuffer device,
   a bale chamber for forming a square bale from flakes of crop pre-compressed in the pre-compression chamber, and
   a tying system for binding the square bale,
   a data entry device disposed on the agricultural towing vehicle,
   wherein, the stuffer device is configured to pre-compress the crop into the flakes in the pre-compression chamber and transport the flakes into the bale chamber,
   wherein, the cutter unit is controlled in dependence on a tying operation conducted by the tying system and on at least one parameter representing a square bale size,
   further wherein, during the picking up of the crop, the cutter unit is operably controlled to be deactivated or operated with the at least one predetermined cut length being longer than at least one of a first and at least one of a last of the flakes during the baling operation.

5. The combination of claim 4, wherein:
   a first value is set via the data entry device for the at least one parameter affecting the square bale size or the at least one parameter affecting the square bale size, and
   a second value is set for a number of the first and the last flakes of a square bale forming operation are predetermined in dependence on which the cutter unit can be controlled.

6. A bale forming method for operation of a large square baler being towed by an agricultural vehicle, comprising:
   providing a pickup unit, a cutter unit, a pre-compression chamber, a stuffer device, a bale chamber for forming a square bale from flakes of crop pre-compressed in the pre-compression chamber, a tying system for binding the square bale, and a data entry device disposed on the agricultural towing vehicle;
   picking up crop lying on the ground;
   cutting the picked up crop via the cutter unit into at least one predetermined cut length;
   pre-compressing the crop via the stuffer device into a plurality of flakes in the pre-compression chamber;
   transporting the plurality of flakes into the bale chamber;
   forming a square bale of the crop;
   binding the square bale with the tying system;
   controlling the cutter unit in dependence on the binding the square bale with the tying system and a parameter affecting a square bale size, where the controlling step takes place during the bale forming method.

7. The method of claim 6, wherein the controlling step comprises controlling the cutter unit so that for at least one of a first and at least one of a last of the plurality of flakes, the cutter unit is operably deactivated or operated with the at least one predetermined cut length being longer than the other plurality of flakes.

* * * * *